J. M. NYE.
WATER GRATE.
APPLICATION FILED JUNE 23, 1914.
1,170,317.
Patented Feb. 1, 1916.
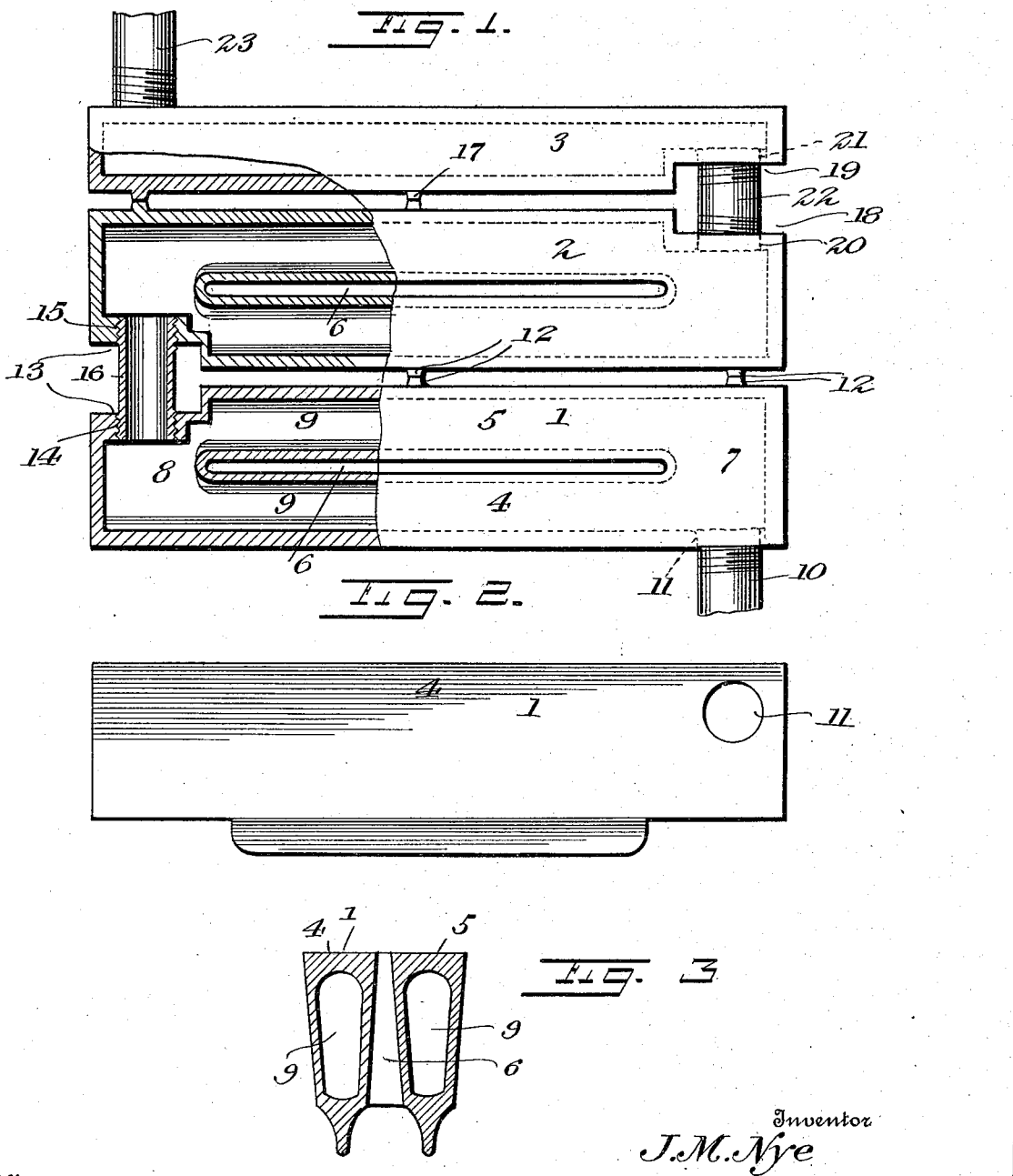
Witnesses
C. C. Faunce
J. W. Garner
Inventor
J. M. Nye
By Victor J. Evans
Attorney

UNITED STATES PATENT OFFICE.

JAMES M. NYE, OF KANSAS CITY, KANSAS.

WATER-GRATE.

1,170,317.   Specification of Letters Patent.   Patented Feb. 1, 1916.

Application filed June 23, 1914. Serial No. 846,894.

*To all whom it may concern:*

Be it known that I, JAMES M. NYE, a citizen of the United States, residing at Kansas City, in the county of Wyandotte and State of Kansas, have invented new and useful Improvements in Water-Grates, of which the following is a specification.

This invention relates to improvements in water grates for use in furnaces, the object of the invention being to provide an improved grate of this character which is extremely durable, is cheap and simple, and the members of which may be readily assembled and disconnected.

The invention consists in the construction, combination and arrangement of devices hereinafter described and claimed.

In the accompanying drawings:—Figure 1 is partly a plan and partly a horizontal sectional view of several members of a water grate constructed in accordance with my invention. Fig. 2 is a side elevation of one of the grate bars. Fig. 3 is a detail vertical transverse sectional view of the same.

My improved grate is composed of detachable members any number of which may be employed according to the required size of the grate. For the purposes of this specification I show three members 1—2—3. The member 1 comprises a pair of bars 4—5 which are slightly spaced apart as at 6 and have their ends united as at 7—8. This member is in practice a hollow casting providing a water chamber 9 which extends longitudinally thereof nearly from end to end. An inlet nipple 10 is screwed in an inlet opening 11 in one side of the member 1 near its front end, the said inlet opening being arranged at the upper side of the water chamber 9. Spacers 12 are formed on opposite sides of the member.

The member 2 is substantially identical in construction with the member 1, is arranged parallel therewith and spaced therefrom by spacers 12. Said members 1 and 2 are formed on their opposing sides, at their rear ends, with coincident recesses 13 and are respectively provided with left and right hand threaded openings 14—15 which are engaged by similarly threaded ends of a nipple 16 which connects the water chambers of said members 1—2 together at the rear side of the grate. The member 3 is formed as a single bar, provided with spacers 17 and having a water chamber which extends longitudinally therethrough. The opposing front portions of the members 2—3 are provided with recesses 18—19 and respectively with left and right hand threaded openings 20—21 to receive the similarly threaded ends of a connecting nipple 22.

The last bar or member of the grate is provided with a discharge nipple 23.

A double bar member may be substituted for the single bar member 3 if the width of the grate renders this necessary or desirable. As many grate members may be used as required.

In the operation of my improved grate the same is connected to a water supply pipe and also to a water discharge pipe and the water circulates through and passes from one member to another throughout the series of members and back and forth across the grate as will be understood thus maintaining the grate bars at even temperature and cooling them to such a degree as to prevent them from being unduly heated and from being distorted in shape. The intake of the first grate member being at the upper side of the water chamber therein all of the grate members are kept filled with water and their tops are hence thoroughly protected. The recesses in the opposing sides of the grate members where the connecting nipples are attached enables the nipples to be operated by wrenches and greatly facilitate the assembling and disassembling of the parts of the grate.

Having thus described my invention, I claim:—

1. A grate comprising hollow members each formed with a water chamber and having spacers on their opposing sides and also having recesses in their opposing sides at one end, and right and left hand threaded nipples screwed in correspondingly threaded openings in the recessed portions of said members and detachably connecting them together.

2. A grate comprising hollow members each formed with a water chamber and having spacers on their opposing sides and also having recesses in their opposing sides at one end, and right and left hand threaded nipples screwed in correspondingly threaded openings in the recessed portions of said members and detachably connecting them together, the said connecting nipples being successively arranged at opposite ends of the grate and so that water is caused to pass in opposite directions through each connected pair of members throughout the grate.

In testimony whereof I affix my signature of presence of two witnesses.

JAMES M. NYE.

Witnesses:
H. E. JOHNSON,
H. BELTER.

Copies of this patent may be obtained for five cents each, by addressing the "Commissioner of Patents, Washington, D. C."